Jan. 6, 1942.                    G. WALTHER ET AL                    2,268,685
                                 BRAKE MECHANISM
                                Filed May 27, 1940                 2 Sheets-Sheet 1

INVENTORS
George Walther
Claud W. Leslie
BY
ATTORNEYS

Jan. 6, 1942.  G. WALTHER ET AL  2,268,685
BRAKE MECHANISM
Filed May 27, 1940  2 Sheets-Sheet 2
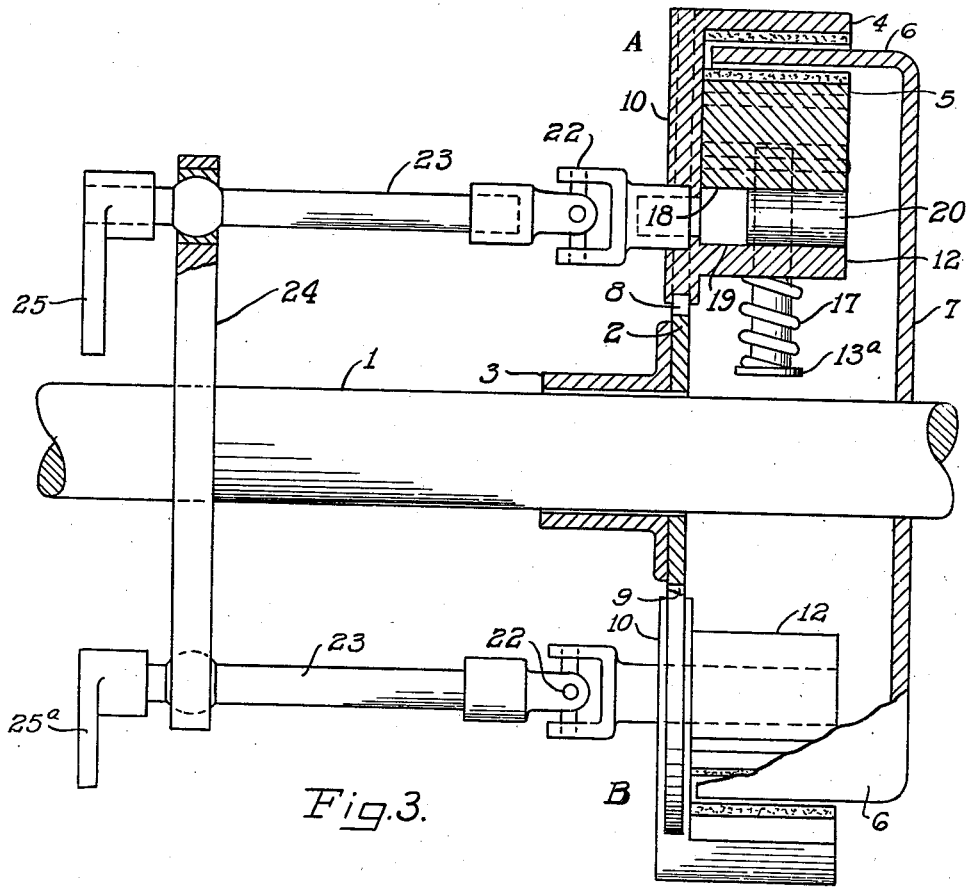
Fig.3.
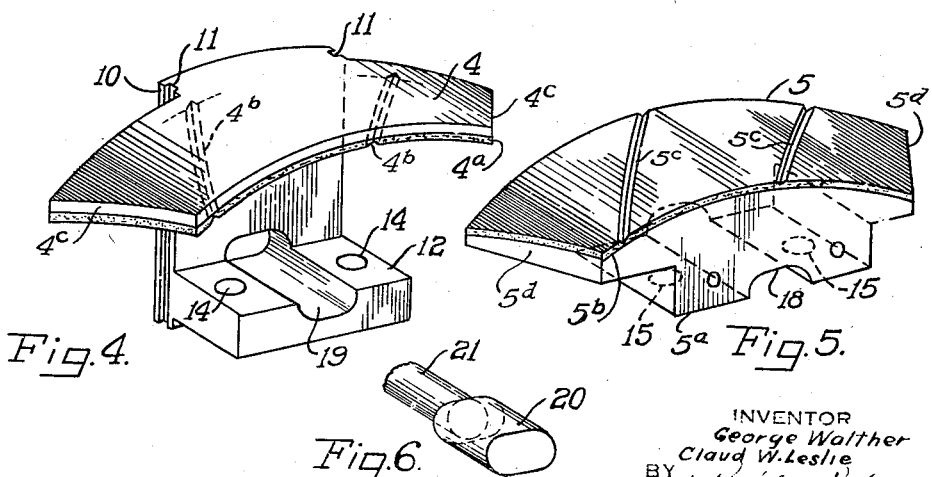
Fig.4.  Fig.5.
Fig.6.
INVENTOR
George Walther
Claud W. Leslie
BY
ATTORNEYS Patented Jan. 6, 1942

2,268,685

UNITED STATES PATENT OFFICE 2,268,685

BRAKE MECHANISM

George Walther and Claude W. Leslie, Dayton, Ohio, assignors to The Dayton Steel Foundry Company, Dayton, Ohio, a corporation of Ohio Application May 27, 1940, Serial No. 337,536

4 Claims. (Cl. 88—76)

This invention relates to brake mechanism of a type employing oppositely acting brake members for engagement with opposing faces of a rotatable member, such as the opposing faces of a clutch disc or of a brake drum flange.

In brake mechanisms of the foregoing type there are usually provided pairs of brake members, each member of which pairs acts toward the other member of said pair to engage the opposite sides or faces of the rotatable member to which the braking force is desired to be applied, the portion of the rotatable member acted upon by the individual brake members of each pair being engaged therebetween by a squeezing action of said members when the brake force is applied.

Constructions of the foregoing type heretofore proposed involve either an initial fixed positioning of the movable brake members with reference to some stationary part of the vehicle or a brake action which tends to subject certain portions of the braked surfaces of the movable brake members to a greater degree of wear than other portions of such surfaces. The first condition above mentioned takes no account of the unevennesses often to be found in the braked surfaces of the rotatable member to which the brakes are applied and involves difficulty in proper adjustment of the movable brake members resulting in lack of uniformity of their application with consequent greater wear upon one than upon the other of said members.

It is, therefore, a principal object of the present invention to provide a brake construction employing complementarily acting brake members for engaging opposing faces of a rotatable member in which the application of said brake members is substantially uniform and in which provision is made for automatic compensating adjustment of complementary brake members to irregularities or unevennesses in the surfaces of the member to which braking force is applied.

It is a further object of the present invention to provide a brake mechanism of the foregoing type of extremely simplified construction, and positive acting nature, in which the pairs of complementary brake members for engaging opposing faces of the rotatable member are provided in units having a limited floating movement in a direction at an angle to the surface of the rotatable member engaged thereby and in which provision is made for locating the brake units in association with a non-rotatable member in a manner such that said units will be positively maintained against movement in one plane, or in a direction parallel to the surface of the rotatable member to be engaged, while permitting a limited floating movement of said units in a direction at an angle to the surface of the rotatable member to be engaged.

In carrying our invention into practice, we provide brake units each comprising a pair of oppositely acting brake members adapted for engagement with the opposing faces of a rotatable member. These brake units are associated with a non-rotatable member in such a manner as to be fixed against movement in a direction parallel to the surface of the rotatable member to be engaged. These brake units are also associated with said non-rotatable member in such a manner as to have a limited floating movement in a direction at an angle to the surfaces of the rotatable member engaged by the individual members of said brake units. The said floating movement is limited only by engagement of the brake members with the rotatable member from opposite sides thereof. The brake units each comprise a pair of brake members, normally maintained in a pre-determined relation, but movable relative to one another in a manner to insure application to the rotatable member of the entire braking surface of each movable brake member uniformly.

Operating means are provided for causing movement of one of the brake members of each unit relative to the other against the action of the means normally maintaining the pre-determined relation of said members. The operation is such that when one of the brake members of a unit is moved relative to the other, engagement of either of said members with the adjacent surface of the rotatable member to which braking force is desired to be applied, results in drawing the other member of such unit into engagement with said surface to produce a very positive and efficient braking action. In the event that there are unevennesses in either of the surfaces of the rotatable member engaged by the individual brake member of a particular unit, the ability of the unit as a whole to move in a direction at an angle to said surfaces automatically compensates for the unevennesses thereof so as not to produce undue wear upon the individual brake members.

The individual brake members of each unit, in addition to being movable relative to each other, are preferably each movable relative to the means by which they are supported upon the vehicle frame as well as movable relative to the rotatable member with which they engage for braking action.

Other objects, advantages and details of the invention will appear more fully as the description thereof progresses in conjunction with the accompanying drawings, in which:

Figure 3 is a horizontal sectional view of the mechanism shown in Figure 1.

Figure 4 is a perspective view of a part of one of the brake units including the outer brake member of such unit.

Figure 5 is a perspective view of the inner brake member of one of the brake units.

Figure 6 is a perspective view of a portion of the operating member for causing relative movement of the brake members of one of the brake units.

Figure 1:
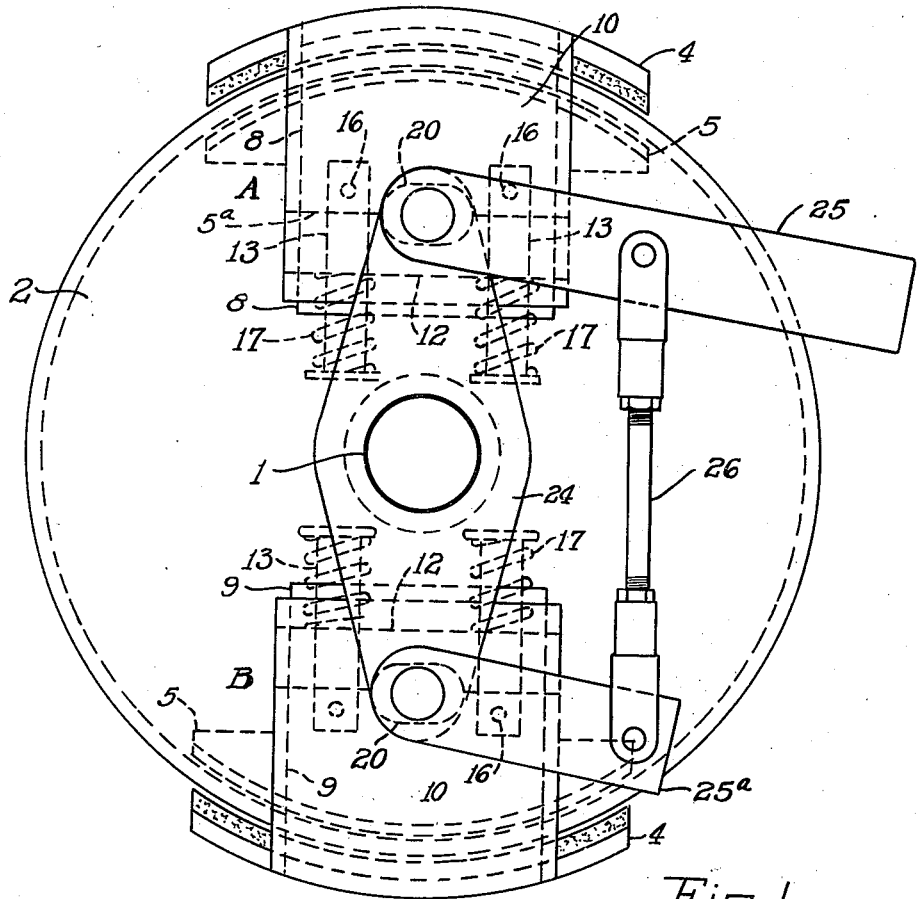
Figure 1 is a side elevation of a brake construction embodying the invention.

Now referring to the drawings for a detailed description of the invention, the same is shown embodied in a construction employing a brake drum of a cylindrical type, commonly utilized in motor vehicles at the present day. In a construction of this type the individual brake members of the brake units provided act upon opposite faces of the flanged portion of said drum, one brake member of each unit in such case constituting an externally acting brake member and the other member of such unit constituting an internally acting brake member.

The vehicle axle is indicated by the numeral 1 in the drawings and the same has mounted thereon a backing plate 2 fixed to a hub member 3, non-rotatably secured to said axle. This backing plate 2 carries brake units, generally indicated by the letters A and B, which are associated with the backing plate 2 for radial movement relative thereto. Each of these brake units A and B comprises an external shoe 4 and an internal shoe 5 for engagement with opposing faces of the flanged portion 6 of a cylindrical brake drum 7 secured to a vehicle wheel, not shown, which is mounted for rotation about the vehicle axle 1. The shoes 4 and 5 are provided with the usual brake lining material, as indicated at 4a and 5b respectively.

The backing plate 2 is provided with radial slots 8 and 9 extending inwardly from the periphery of the backing plate and between the sides of which the brake units A and B are carried for sliding movement in said slots relative to the plate 2. The brake units each comprise a slide member 10 provided with grooves 11 into which the opposing portions of the backing plate 2, adjacent the sides of the slots 8 and 9, extend so that the slide members 10 are mounted for sliding movement relative to the backing plate 2 in said slots 8 and 9.

The external brake shoe 4 is suitably secured to the slide member, or formed integral therewith. The slide member 10 also has suitably secured thereto, or formed integral therewith, a base portion 12 for supporting the internal shoe 5 which is secured thereto by means of pins 13 passing through openings 14 in said base portion 12 and into sockets 15 provided in the base portion 5a of the member 5.

The pins 13 are secured in the base portion 5a by means of transverse screw-threaded pins 16 passing transversely through the pins 13 and screw-threaded into the base portion 5a. The pins 13 are provided with heads 13a and surrounding the protruding portions of said pins are coil springs 17 engaging the heads 13a of said pins and the under side of the base portion 12. The springs 17 normally maintain the braking surfaces of the shoes 4 and 5 in spaced relation with the base portion 5a of the shoe 5 abutting the base portion 12.

The base portion 5a and the base portion 12 are provided respectively with cooperating grooves 18 and 19 which are half oval in cross section and which, when the base portions 5a and 12 are in abutment, together form an oval passage within which is positioned a correspondingly shaped cam portion 20 formed on the end of a rod 21 having a universal connection, as at 22, with an operating rod 23 pivotally mounted in a bracket 24 secured to the vehicle axle 1. In the embodiment shown, two brake units A and B are provided and there will be separate operating means for each such unit, which operating means comprises a cam member 20, rods 21 and 23 connected by the universal joint 22.

Levers 25 and 25a are fixed to the operating rods 23 for the brake units A and B respectively for turning said rods 23 relative to the bracket 24 to operate the cam members 20, whereby to engage the brake shoes 4 and 5 of each unit A and B with the flange 6 of the drum 7 in a manner to be hereinafter described. The levers 25 and 25a may be connected together by adjustable linkage 26 for simultaneous operation of the brake units A and B, or the said units may be separately operated by actuation of the levers 25 and 25a without inter-connection therebetween, if desired.

In the embodiment shown, the brake units A and B are intended to be simultaneously operated to apply braking force to the drum 7 upon actuation of the lever 25 which may be suitably connected to operating instrumentalities such as a foot or hand lever usually provided for manipulation by the operator of a vehicle to which the brake construction herein described is applicable.

Figure 2:
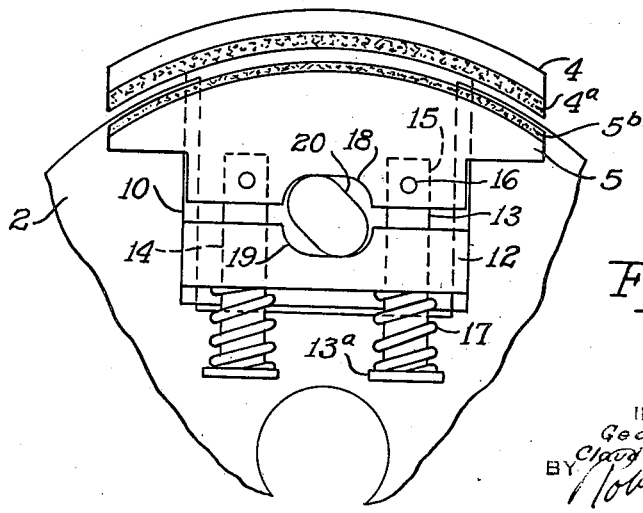
Figure 2 is a partial side elevation of the brake construction illustrated in Figure 1 taken from the opposite side and with the brake drum removed.

In operation, angular movement of the lever 25 will effect rotation of the operating rods 23 relative to the bracket 24 with consequent rotation of the cam members 20, causing separation of the base portions 5a and 12, as seen best in Figure 2, as the brake members 4 and 5 are caused to move toward each other against the action of the springs 17 into engagement with opposing faces of the flange 6. Because of the ability of the units A and B to float radially respecting the backing plate 2 by reason of the sliding association of the members 10 therewith, and also by reason of the universal connection between the rods 21 and 23, the shoes 4 and 5 need not be initially equi-distantly spaced from the respective outer and inner surfaces of the flange 6 with which they are adapted to engage. Hence, before actuation of the lever 25 to apply braking force to the drum 7, one or the other of the shoes 4 or 5 of each unit A and B may be in light contact with the respective surface of the flange 6 with which it is adapted to brakingly engage upon operation of the operating instrumentalities for that purpose and this will result in no substantial amount of wear upon the member 4 or 5 so engaged, because of the ability of the entire unit to float radially respecting the backing plate. Under a condition in which one of the brake members 4 or 5 is positioned in light contact with, or closer to, the drum flange 6 than the other of said brake members, rotation of the cam 20 causing separation of the base portions 5a and 12 with consequent movement of the brake shoes 4 and 5 toward each other against the action of the springs 17 will tend initially to engage with the drum the particular shoe 4 or 5 of a particular unit A or B, which under the particular conditions happens to be spaced the least distance from the respective surface of the flange 6 with which it is adapted to brakingly engage.

Upon engagement of one of the brake shoes 4 or 5 with the flange 6 during rotation of the cam 20, the further rotation of the cam 20 will cause the other shoe of such unit to move relatively to the first until the latter also engages the opposite face of the flange 6, whereupon the further rotation of the cam 20 will cause application of the brake shoes 4 and 5 to the drum 7 with equal force.

It will be noted that the brake shoes 4 and 5 always move toward each other in a straight line upon rotation of the cam 20 for that purpose. There is no angular movement of the shoes 4 and 5 with respect to the periphery of the flange 6 and no angular movement of the surfaces of the shoes 4 and 5 relative to each other such as would cause any portion of the engaging surfaces of such shoes to engage the flange 6 before any other portion of such engaging surfaces of such shoes. The movement of the shoes 4 and 5 in a straight line toward each other results in a substantially equalized simultaneous application of the entire braking surface of each of the brake shoes 4 and 5 with the brake 6. This is not to say that both shoes are necessarily simultaneously applied to the drum 7 with equal force at a given time, but merely that the entire braking surface of either shoe is substantially uniformly applied to the respective surface of the flange 6 when said shoe engages with said surface.

The foregoing is advantageous in that the braking surfaces of the shoes 4 and 5 are thereby caused to wear uniformly and no portion thereof is subjected to any substantially greater degree of wear than any other portion.

The provision for enabling a certain degree of radial floating movement of the units A and B with respect to the backing plate 2 is advantageous in that it eliminates to a certain degree the present requirements for the accurate machining of the braked surface of the drum 7 because the ability of the units A and B to float radially respecting the backing plate 2 compensates for unevennesses in the braked surfaces of the drums produced in the manufacture of said drums or by wear during use. Thus, the units A and B may freely move radially respecting the backing plate 2 within the limits defined by the difference between the thickness of the brake drum flange 6 and the distance between the brake shoes 4 and 5 so that undue wear will not result to either of the braking surfaces of the shoes 4 or 5 on account of unevenness in the drum 7 engaged thereby, because of the ability of the unit to move radially to compensate for such unevennesses.

It will be observed that rotation of the cam member 20 to effect braking engagement of the shoes 4 and 5 with the respective opposing faces of the rotatable element 7 causes movement of the shoes 4 and 5 relative to each other and movement of each shoe relative to both the backing plate 2 and the rotatable member 7.

The linings 4a and 5b of the brake shoes 4 and 5 respectively are preferably formed with diagonal grooves 4b and 5c respectively as seen best in Figures 4 and 5. These grooves provide channels for entrance of foreign material thereinto which may lodge on the surfaces of the flange 6 of the brake drum, whereby such foreign material scraped from said surfaces by engagement of the brake shoe linings therewith passes into said channels and is moved outwardly therealong to be eliminated by passing out of said channels over the edges of the brake shoes. Likewise, the edges 4c and 5d of the shoes are made angular so that upon engagement with the drum foreign matter will be scraped off and moved outwardly of the drum.

It may be pointed out that a particular advantage of the construction herein shown and described resides in the resulting conservation of space between the tire rim and the brake drum. The operating mechanism is entirely confined within the area defined practically by the diameter of the brake drum and thus there is no necessity for arranging for additional space between the brake drum and tire rim.

Having thus described our invention, what we claim as new and desire to secure by Letters Patent of the United States is:

1. In a device of the class described, in combination, a rotatable brake drum having a peripheral flange, a non-rotatable backing plate provided with a slot extending inwardly from its periphery, and a brake unit non-rotatably associated with said plate and comprising a slide member engaged in said slot and freely slidable therein relative to said plate, a brake member fixed to said slide member and frictionally engageable with one surface of said flange, a second brake member mounted on said slide member and movable relative thereto toward and away from the opposing surface of said flange, and yieldable means associated with said second brake member and said slide member for normally maintaining a predetermined spaced relation between said brake members, said slide member being freely slidable relative to said plate and relative to said drum in a direction at an angle to said surfaces while said predetermined relation of said brake members is maintained, and operating means for moving said second brake member relative to said slide member against the action of said yieldable means toward said first brake member, whereby to cause movement of both of said brake members into braking engagement with said flange.

2. In a device of the class described, in combination, a rotatable brake drum having a peripheral flange, a non-rotatable backing plate, and a brake unit non-rotatably associated with said plate and comprising a slide member freely slidable relative to said plate, a brake member fixed to said slide member and frictionally engageable with one surface of said flange, a second brake member mounted on said slide member and movable relative thereto toward and away from the opposing surface of said flange, and yieldable means associated with said second brake member and said slide member for normally maintaining a predetermined spaced relation between said brake members, said slide member being freely slidable relative to said plate and relative to said drum in a direction at an angle to said surfaces while said predetermined relation of said brake members is maintained, and operating means for moving said second brake member relative to said slide member against the action of said yieldable means toward said first brake member, whereby to cause movement of both of said brake members into braking engagement with said flange.

3. In a device of the class described, in combination, a rotatable brake drum having a peripheral flange, a non-rotatable backing plate, and a brake unit non-rotatably associated with said plate and comprising a slide member freely slidable relative to said plate, said slide member having a base provided with openings therein, a brake member fixed to said slide member and frictionally engageable with one surface of said flange, a second brake member mounted on said slide member and movable relative thereto toward and away from the opposing surface of said flange, pins fixed to said second brake member and passing through the openings in said base, and springs engaging the free ends of said pins and engaging said base for normally maintaining a predetermined spaced relation between said brake members, said slide member being freely slidable relative to said plate and relative to said drum in a direction at an angle to said surfaces while said predetermined relation of said brake members is maintained, and operating means for moving said second brake member relative to said slide member against the action of said springs toward said first brake member, whereby to cause movement of both of said brake members into braking engagement with said flange.

4. In a device of the class described, in combination, a rotatable brake drum having a peripheral flange, a non-rotatable backing plate provided with a slot extending inwardly from its periphery, and a brake unit non-rotatably associated with said plate and comprising a slide member engaged in said slot and freely slidable therein relative to said plate, said slide member having a base provided with openings therein, a brake member fixed to said slide member and frictionally engageable with one surface of said flange, a second brake member mounted on said slide member and movable relative thereto toward and away from the opposing surface of said flange, pins fixed to said second brake member and passing through the openings in said base, and springs engaging the free ends of said pins and engaging said base for normally maintaining a predetermined spaced relation between said brake members, said slide member being freely slidable relative to said plate and relative to said drum in a direction at an angle to said surfaces while said predetermined relation of said brake members is maintained, and operating means for moving said second brake member relative to said slide member against the action of said springs toward said first brake member, whereby to cause movement of both of said brake members into braking engagement with said flange.

GEORGE WALTHER.
CLAUDE W. LESLIE.